United States Patent [19]

North

[11] 4,397,342
[45] Aug. 9, 1983

[54] PIN-ROUTER MOUNTING DEVICE AND METHOD

[76] Inventor: Joe E. North, 2210 Delker Dr., San Angelo, Tex. 76901

[21] Appl. No.: 288,043

[22] Filed: Jul. 29, 1981

[51] Int. Cl.³ .......................... B27G 19/00; B27C 9/00
[52] U.S. Cl. ............................... 144/1 F; 144/251 A; 144/252 R
[58] Field of Search ........... 144/251 R, 251 A, 252 R, 144/252 A, 1 F; 409/182

[56] References Cited

U.S. PATENT DOCUMENTS

| | | | |
|---|---|---|---|
| 1,528,536 | 3/1925 | DeWalt . | |
| 2,672,170 | 3/1954 | Johnson | 143/33 |
| 2,852,050 | 9/1958 | Horstmann et al. | 144/134 |
| 3,099,298 | 7/1963 | Bellini | 144/1 F |
| 3,302,669 | 2/1967 | Edler | 143/6 |
| 3,786,846 | 1/1974 | Mehring | 144/251 |
| 3,837,383 | 9/1974 | Ko | 144/251 A |
| 3,923,086 | 12/1975 | Spohn, Jr. | 144/134 |
| 4,084,629 | 4/1978 | Kreusler | 144/1 F |
| 4,312,391 | 1/1982 | Snow | 144/1 F |

Primary Examiner—W. D. Bray
Attorney, Agent, or Firm—Charles D. Gunter, Jr.

[57] ABSTRACT

A mounting-device for a pin-router for use on a conventional radial table saw which attaches in the same manner as a saw blade and uses the saw's elevation mechanism. The device has a housing with an opening for receiving the saw motor shaft. Mounting brackets on the housing attach the housing to the horizontal beam of the radial saw to prevent pivotal movement of the housing about the saw motor shaft. An adjustable support yoke secures the pin-router in the housing so that the pin-router longitudinal axis is normal to the plane of the saw table.

5 Claims, 2 Drawing Figures

PIN-ROUTER MOUNTING DEVICE AND METHOD

BACKGROUND OF THE INVENTION

This invention relates generally to power woodworking tools and specifically to an adapting device for mounting a pin-router on a conventional radial table saw.

Pin-routing is a woodworking technique which has been used for many years in furniture factories and cabinet shops and has become increasingly popular with amateur woodworkers. In pin-routing, a pin is mounted in the work table and used to guide a template to which the workpiece is attached. As the pin follows the contours of the template, the router bit duplicates the design in the workpiece. In making the duplicate, it is important that the operator not try to cut completely through the workpiece on one pass with the router. Instead, it is preferable to make multiple passes. For example, the first pass might be made by cutting to a depth of ⅛ inch into the workpiece. On the second pass, the router is lowered ⅛ inch. Because it is necessary to vary the cutting depth of the router, a vertical elevation mechanism is required for precise cutting. In the past, professional cabinet makers and furniture manufacturers used pin routing devices which included elevational adjustment mechanisms which cost thousands of dollars. Other "router-arm" designs intended for the home hobbyist cost hundreds of dollars because of the requirement of a precise vertical adjustment mechanism.

There exists a need, therefore, for a pin-router elevation mechanism which will allow precise adjustment of cutting depth and yet which is affordable by the home hobbyist.

SUMMARY OF THE INVENTION

The present invention is a pin-router mounting device for mounting a pin-router on a radial table saw of the type having a flat table, a vertical post fixed to one edge of the table, a vertically adjustable horizontal beam extending at a right angle to the post over the table and being movably secured to the post for selective vertical movement, and a radial saw motor secured to the beam and having a saw motor shaft. The mounting device includes a housing having an opening adapted to receive the radial saw motor shaft. Mounting means on the housing are provided for attaching the housing to the horizontal beam to prevent pivotal movement of the housing about the motor shaft. Support means are provided for removably securing the pin-router in the housing so that the pin-router longitudinal axis is normal to the plane of the table.

In the preferred embodiment, locking means are provided for engaging the housing on the motor shaft. Mounting brackets on the housing have opposing flanges adapted to extend on opposite sides of the horizontal beam. The flanges have screw slots and screws for engaging the horizontal beam. An adjustable support yoke removably secures the pin router in the housing.

In the method of mounting a pin router on a radial table saw, a housing is provided with an opening adapted to receive the saw motor shaft. The housing is then locked on the shaft to vertically position the housing. Next, that portion of the housing above the opening is secured to the horizontal beam to prevent pivotal movement of the housing about the motor shaft. A pin-router is removably secured in the housing so that the pin-router longitudinal axis is normal to the plane of the table, whereby the pin-router is vertically adjustable by adjusting the horizontal beam of the saw.

Additional objects, features, and advantages will be apparent in the following description.

DETAILED DESCRIPTION OF THE EMBODIMENT

Figure 1:
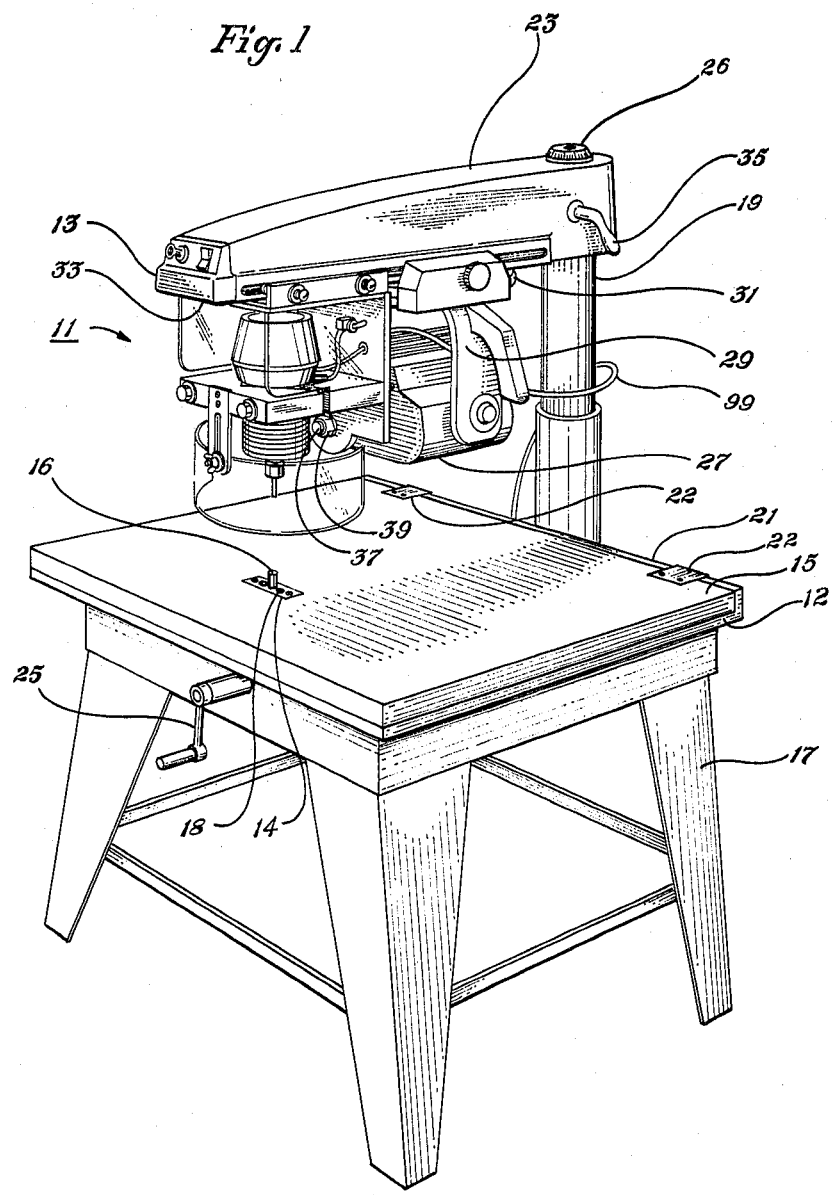
FIG. 1 is a perspective view of the pin-router mounting device in place on a radial table saw.

Turning now to FIG. 1, there is shown a pin-router mounting device designated generally as 11 in place on a radial table saw 13. Table saw 13 includes a flat table surface 12 which is supported by legs 17 and which has a vertical post 19 fixed to the rear edge 21 of the table 12. Table surface 12 can be provided with an auxiliary leaf 15 removably mounted on table surface 12 against rear edge 21 as by clamps 22. A plate 14 is inset flush with the surface 15 and is provided with one or more threaded holes 18 each of which is adapted to receive a pin 16. Plate 14 can also be inset into surface 12 if leaf 15 is not used. A vertically adjustable horizontal beam 23 extends at a right angle to the post 19 over the table 12 and is movably secured to post 19 for selective vertical movement with respect to the post. In the typical case, a crank 25 located in front under the flat table surface 12 is employed to drive suitable internal gearing for raising and lowering the horizontal beam 23. A dial indicator 26 located at the top of post 19 indicates the angular position of the horizontal beam 23 with respect to post 19 in degrees.

A radial saw motor 27 is secured to the horizontal beam 23 in this case by bails 29 and carriage 31. Carriage 31 can be moved radially outward from post 19 along a suitable track on the bottom surface 33 of beam 23 by means of a handle 35. Radial saw motor 27 has an output shaft 37 onto which a saw blade is normally mounted by means of a nut 39.

Figure 2:
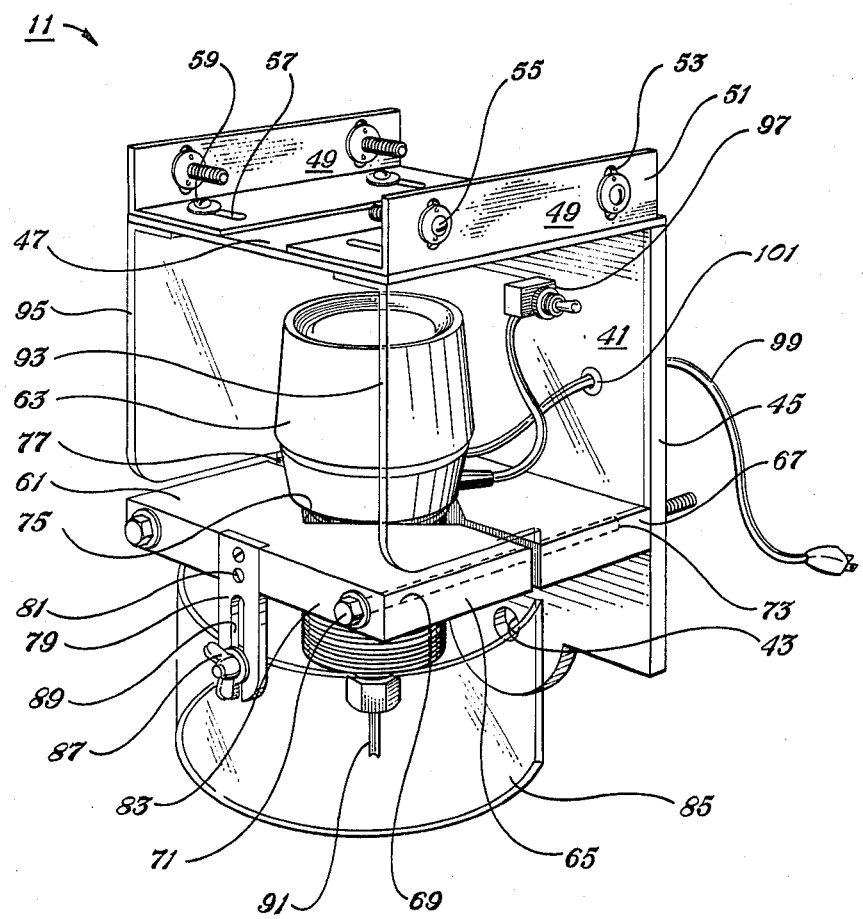
FIG. 2 is a close-up isolated view of the pin-router mounting device of FIG. 1.

Turning to FIG. 2, the pin-router mounting device 11 is shown in greater detail. The mounting device includes a housing 41 having an opening 43 adapted to receive the radial saw motor shaft 37. Housing 41 includes a rear wall 45 and a top wall 47 on which is carried mounting means for attachment to the horizontal beam 23 to prevent pivotal movement of the housing 41 about the motor output shaft 37. The mounting means preferably comprise mounting brackets 49 having opposing vertical flanges 51 adapted to extend on opposite sides of horizontal beam 23 when the mounting device is in place on motor shaft 37. Vertical flanges 51 have a pair of matching screw slots 53 and screws 55 for engaging the horizontal beam 23. Mounting brackets 49 are fixed to the top wall 47 of housing 41 by horizontal screw slots 57 and screws 59. By adjusting the position of screws 59 in screw slots 57, mounting brackets 49 can be selectively positioned on either side of beam 23 to accommodate beams of varying width.

Nut 39 can be tightened on output shaft 37 to serve as a locking means for engaging the housing on the motor shaft.

An adjustable support yoke 61 removably secures a conventional pin-router 63 in housing 41 so that the longitudinal axis of pin-router 63 is normal to the plane of table 12 when the housing 41 is in place on the motor shaft 37. Support yoke 61 is a generally square block divided into matching front and rear portions 65, 67, respectively. Matching bores 69 on opposite sides of portions 65, 67 are provided for a pair of mounting bolts 71 which extend through bores 69 and holes 73 where they are secured by a pair of nuts (not shown). A V-shaped recess 75 is cut in the interior sidewalls 77 of front and rear portions 65, 67 for receiving the pin-router 63. In this manner, pin-router 63 is removably secured in housing 41 with yoke 61 contacting the exterior of the pin-router at four points. By adjusting bolts 71 in bores 69 and holes 73, the support yoke 61 will accommodate routers of varying external dimension. Yoke 61 can also be made of a resilient material which will be deformed to fit securely about the router exterior as bolts 71 are tightened into place.

A downwardly extending arm 79 secured to the outer sidewall 83 of yoke front portion 65 by screws 81 carries a curved plexi-glass safety guard 85 by means of a wing nut 87. Guard 85 is positioned by adjusting wing nut 87 in slot 89 of arm 79 to surround the pin-router bit 91 for greater operator safety.

Housing 41 can also be provided with matching sidewalls 93, 95. An on-off switch 97 mounted on sidewall 93 controls the power to the pin-router 63. A cord 99 for supplying power to the pin-router 63 passes through a hole 101 in rear wall 45 and runs to a suitable electrical outlet.

In the method of mounting a pin-router on a radial table saw, the radial saw blade is first removed from the saw shaft by removing the nut 39 from the shaft 37 (FIG. 1). The saw is in the "out-rip" position with the saw motor shaft 37 longitudinally aligned with the horizontal beam 23 and the saw motor electrical cord is disconnected so that the motor is inoperative. Next, the housing 41 of the mounting device 11 is positioned on the radial saw by positioning opening 43 on motor shaft 37 and replacing nut 39. Once the vertical position of the housing is fixed by tightening nut 39, that portion of the housing above opening 43 is secured to the horizontal beam 23 to prevent pivotal movement of the housing 41 about the motor shaft 37. This is accomplished by tightening screws 55 in slots 53 thereby attaching brackets 49 to beam 23.

A conventional pin router 63 is removably secured in housing 41 so that the pin-router longitudinal axis is normal to the plane of the table 12, whereby the pin-router is vertically adjustable by adjusting the horizontal beam 23 on vertical post 19. The pin-router is secured in housing 41 by support yoke 61 and bolts 71. Power cord 99 from pin-router 63 is connected to a wall outlet.

An invention has been provided with significant advantages. The present mounting device allows a conventional pin-router to be mounted on a radial table saw so that the saw elevation mechanism can be utilized to provide precise adjustment of cutting depth. In this way, an ordinary radial table saw can be converted to a pin-router arm by simply removing the radial saw blade and utilizing the mounting device. The mounting device can be manufactured economically from commercially available materials and has no moving parts or critical manufacturing tolerances. The mounting device will provide a pin-router elevation mechanism at a fraction of the cost of router-arms currently available in the market place. Installing the mounting device simply involves removing the radial saw blade and no other modifications to the existing saw.

While the invention has been shown in only one of its forms, it should be apparent to those skilled in the art that it is not thus limited but is susceptible to various changes and modifications without departing from the spirit thereof.

I claim:

1. A pin-router mounting device for use with a radial table saw of the type having a flat table, a vertical post fixed to one edge of said table, a vertically adjustable horizontal beam extending at a right angle to said post over said table and being movably secured to said post for selective vertical movement, and a radial saw motor secured to said beam and having a saw motor shaft, comprising:

a housing having an opening adapted to receive said radial saw motor shaft;
   locking-means for engaging said housing on said motor shaft;
   mounting means on said housing for attachment to said horizontal beam to prevent pivotal movement of said housing about said motor shaft; and
   adjustable support means for removably securing said pin-router in said housing so that said pin-router longitudinal axis is normal to the plane of said table.

2. A pin-router mounting device for use with a radial table saw of the type having a flat table, a vertical post fixed to one edge of said table, a vertically adjustable horizontal beam extending at a right angle to said post over said table and being movably secured to said post for selective vertical movement, and a radial saw motor secured to said beam and having a saw motor shaft, comprising:

a housing having an opening adapted to receive said radial saw motor shaft;
   locking means for engaging said housing on said motor shaft;
   mounting brackets on said housing for attachment to said horizontal beam to prevent pivotal movement of said housing about said motor shaft; and
   an adjustable support yoke for removably securing said pin-router in said housing so that said pin-router longitudinal axis is normal to the plane of said table.

3. The pin-router mounting structure of claim 2, wherein said support yoke is formed of resilient material.

4. The pin-router mounting structure of claim 3, wherein said mounting brackets have opposing flanges adapted to extend on opposite sides of said horizontal beam.

5. The pin-router mounting structure of claim 3, wherein said flanges having vertical screw slots and screws for engaging said horizontal beam and wherein said brackets are fixed to said housing by horizontal screw slots and screws for selectively positioning said brackets on either side of said beam.

* * * * *